(12) United States Patent
Tigelaar et al.

(10) Patent No.: US 10,241,319 B2
(45) Date of Patent: Mar. 26, 2019

(54) ELECTROWETTING DISPLAY PIXELS WITH FLUID MOTION INITIATOR

(71) Applicant: Amazon Technologies, Inc., Seattle, WA (US)

(72) Inventors: Hildebrand Tigelaar, Eindhoven (NL); Gor Manukyan, Veldhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 303 days.

(21) Appl. No.: 14/981,554

(22) Filed: Dec. 28, 2015

(65) Prior Publication Data

US 2017/0184839 A1 Jun. 29, 2017

(51) Int. Cl.
*G02B 26/00* (2006.01)
*G02B 26/02* (2006.01)

(52) U.S. Cl.
CPC ............ *G02B 26/005* (2013.01); *G02B 26/02* (2013.01); *G02B 2207/115* (2013.01)

(58) Field of Classification Search
CPC .................................................... G02B 26/005
USPC ......................................................... 359/290
See application file for complete search history.

(56) References Cited

U.S. PATENT DOCUMENTS

| 7,161,203 | B2* | 1/2007 | Basceri | H01L 21/28194 |
| | | | | 257/296 |
| 7,180,677 | B2* | 2/2007 | Fujii | G02B 26/005 |
| | | | | 359/295 |
| 7,463,398 | B2* | 12/2008 | Feenstra | G02B 26/005 |
| | | | | 345/107 |
| 2005/0151709 | A1* | 7/2005 | Jacobson | G02B 26/005 |
| | | | | 345/84 |
| 2013/0301108 | A1 | 11/2013 | Lim et al. | |
| 2014/0063586 | A1 | 3/2014 | Jung et al. | |

FOREIGN PATENT DOCUMENTS

| EP | 1478974 | 11/2004 |
| WO | WO2011002957 | 1/2011 |
| WO | WO2013081859 | 6/2013 |

OTHER PUBLICATIONS www.goodfellow.com. "Polyvinylidenefluoride ( PVDF )." Polyvinylidenefluoride, 2008, www.goodfellow.com/E/Polyvinylideneflouride.html.*
"Relative Permittivity." Wikipedia, Wikimedia Foundation, Nov. 22, 2017, en.wikipedia.org/wiki/Relative_permittivity.*
PCT Search Report and Written Opinion dated Apr. 10, 2017 for PCT application No. PCT/US2016/068419, 16 pages.

* cited by examiner

*Primary Examiner* — Zachary W Wilkes
(74) *Attorney, Agent, or Firm* — EIP US LLP

(57) ABSTRACT

An electrowetting display comprises a support plate on which individual electrowetting pixels separated from one another by pixel walls are formed. The individual electrowetting pixels include an electrode layer on the support plate, and a dielectric barrier layer on the electrode layer. The dielectric barrier layer comprises a first portion having a first dielectric constant and a second portion having a second dielectric constant that is substantially less than first dielectric constant. A hydrophobic layer is on the first portion and the second portion of the dielectric barrier layer.

20 Claims, 7 Drawing Sheets

ELECTROWETTING DISPLAY PIXELS WITH FLUID MOTION INITIATOR

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, finding ways to enhance user experience and satisfaction continues to be a priority. Moreover, increased multimedia use imposes high demands on designs, packaging, and fabricating display devices, as content available for mobile use becomes more extensive and device portability continues to be a high priority.

An electrowetting display includes an array of pixels individually bordered by pixel walls that retain liquid, such as opaque oil, for example. Light transmission through each pixel is adjustable by electronically controlling a position of the liquid in the pixel. Resolution and quality of an electrowetting display may depend on a number of factors, such as motion of liquids during operation, optical transmissivity or reflectivity of material layers of the electrowetting display and pixel size, just to name a few examples.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
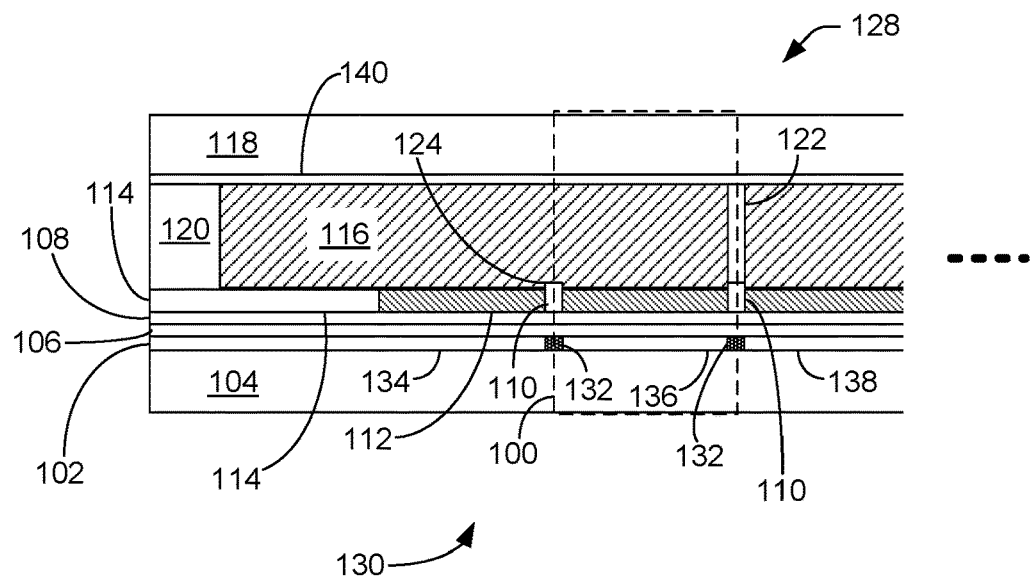
FIG. 1 illustrates a cross-section of a portion of an electrowetting display device, according to some embodiments.

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like. Various embodiments described herein include techniques for assembling electronic devices including these components for the electrowetting displays and other features described herein.

An electrowetting pixel may include one or more structures to form a patterned or non-homogeneous electric field. For example, a portion of a structure having a relatively large dielectric constant as compared to other portions of the structure may form a particularly high electric field gradient, which may initiate flow of a fluid if the electrowetting pixel enters into an active state. The fluid selectively covers or uncovers an area of the electrowetting pixel so that the electrowetting pixel is in either an inactive state or an active state. Accordingly, initiating flow of the fluid uncovers the electrowetting pixel and places the electrowetting pixel in an active state.

Such a portion of a structure having a relatively large dielectric constant as compared to other portions of the structure is herein called a fluid motion initiator (FMI). For example, an FMI may be a portion of a dielectric layer below a hydrophobic layer of an electrowetting pixel. Such an FMI may have any of a number of shapes, in plan or top view of the pixel, such as rectangular or square-shaped, L-shaped, or U-shaped, just to name a few examples. An FMI may be adjacent to one or more pixel walls that partition the pixel from neighboring pixels. For example, an FMI may be within a few microns from a pixel wall (or as much as half a pixel width away from the pixel wall). In some examples, an FMI may be partially beneath a pixel wall. FMI's may have relatively greater length/extent or shape compared to examples described herein, and claimed subject matter is not limited in this respect. Moreover, such shapes need not be precise and may include, for example, corners that are rounded or squared, and/or segments having different lengths, and so on.

A display device, such as an electrowetting display device, may be a transmissive, reflective or transflective display that generally includes an array of pixels (e.g., which may comprise subpixels) configured to be operated by an active matrix addressing scheme. For example, rows and columns of electrowetting pixels are operated by controlling voltage levels on a plurality of source lines and gate lines. In this fashion, the display device may produce an image by selecting particular pixels to transmit, reflect or block light. Pixels are addressed (e.g., selected) via rows and columns of the source lines and gate lines that are electrically connected to transistors (e.g., used as switches) included in each pixel. Transistors take up a relatively small fraction of the area of each pixel to allow light to efficiently pass through (or reflect from) the display pixel. Herein, a pixel may, unless otherwise specified, comprise a subpixel or pixel that includes two or more subpixels of an electrowetting display device. Such a pixel or subpixel may be the smallest light transmissive, reflective or transflective pixel of a display that is individually operable to directly control an amount of light transmission through or reflection from the pixel. For example, in some implementations, a pixel may comprise a red subpixel, a green subpixel, and a blue subpixel. In other implementations, a pixel may be a smallest component, e.g., the pixel does not include any subpixels.

Electrowetting displays include an array of pixels sandwiched between two support plates, such as a bottom support plate and a top support plate. For example, a bottom support plate in cooperation with a top support plate may contain pixels that include electrowetting oil, electrolyte solution and pixel walls between the support plates. Support plates may include glass, plastic (e.g., a transparent thermoplastic such as PMMA or other acrylic), or other transparent material and may be made of a rigid or flexible material, for example.

Pixels include various layers of materials built upon a bottom support plate. One such layer is a hydrophobic fluoropolymer (AF) upon which pixel walls are built.

Hereinafter, example embodiments include, but are not limited to, reflective electrowetting displays that include a clear top support plate and a bottom support plate, which need not be transparent. The clear top support plate may comprise glass or any of a number of transparent materials, such as plastic, quartz, semiconductors, and so on, and claimed subject matter is not limited in this respect. "Top" and "bottom", as used herein to identify the support plates of an electrowetting display, do not necessarily refer to a direction referenced to gravity or to a viewing side of the electrowetting display. Also, as used herein for sake of convenience of describing example embodiments, the top support plate is that through which viewing of pixels of a (reflective) electrowetting display occurs.

In some embodiments, a reflective electrowetting display comprises an array of pixels sandwiched between a bottom support plate and a top support plate. The bottom support plate may be opaque while the top support plate is transparent. Herein, describing a pixel or material as being "transparent" means that the pixel or material may transmit a relatively large fraction of the light incident upon it. For example, a transparent material or layer may transmit more than 70% or 80% of the light impinging on its surface, though claimed subject matter is not limited in this respect.

Pixel walls retain at least a first fluid which is electrically non-conductive, such as opaque or colored oil, in the individual pixels. A cavity formed between the support plates is filled with the first fluid (e.g., retained by pixel walls) and a second fluid (e.g., considered to be an electrolyte solution) that is electrically conductive or polar and may be a water or a salt solution such as a solution of potassium chloride water. The second fluid may be transparent, but may be colored, or light-absorbing. The second fluid is immiscible with the first fluid.

Individual reflective electrowetting pixels may include a reflective layer on the bottom support plate of the electrowetting pixel, a transparent electrode layer adjacent to the reflective layer, and a hydrophobic layer on the electrode layer. Pixel walls of each pixel, the hydrophobic layer, and the transparent top support plate at least partially enclose a liquid region that includes an electrolyte solution and an opaque liquid, which is immiscible with the electrolyte solution. An "opaque" liquid, as described herein, is used to describe a liquid that appears black to an observer. For example, an opaque liquid strongly absorbs a broad spectrum of wavelengths (e.g., including those of red, green and blue) in the visible region of electromagnetic radiation. In some implementations, the opaque liquid is a nonpolar electrowetting oil.

The opaque liquid is disposed in the liquid region. As described in detail below, coverage area of the opaque liquid on the bottom hydrophobic layer is electronically adjustable to affect the amount of light incident on the reflective electrowetting display that reaches the reflective material at the bottom of each pixel.

In addition to pixels, spacers and edge seals may also be located between two support plates. Support plates may comprise any of a number of materials, such as plastic, glass, quartz, semiconductors, and so on, and claimed subject matter is not limited in this respect.

Spacers and edge seals which mechanically connect a first support plate with a second overlying support plate, or which form a separation between the first support plate and the second support plate, contribute to mechanical integrity of the electrowetting display. Edge seals, for example, being disposed along a periphery of an array of electrowetting pixels, may contribute to retaining (e.g., first and second) fluids between the first support plate and the second overlying support plate. Spacers are desirably transparent so as to not hinder throughput of light in the electrowetting display. Transparency of spacers may at least partially depend on the refractive index of the spacer material, which should be similar to or the same as the refractive indices of surrounding media. Spacers are also desirably chemically inert to surrounding media.

In some embodiments, a display device as described herein may comprise a portion of a system that includes one or more processors and one or more computer memories, which may reside on a control board, for example. Display software may be stored on the one or more memories and may be operable with the one or more processors to modulate light that is received from an outside source (e.g., ambient room light) or out-coupled from a light guide of the display device. For example, display software may include code executable by a processor to modulate optical properties of individual pixels of the electrowetting display based, at least in part, on electronic signals representative of image or video data. The code may cause the processor to modulate the optical properties of pixels by controlling electrical signals (e.g., voltages, currents, fields, and so on) on, over, or in layers of the electrowetting display.

FIG. 1 is a cross-section of a portion (e.g., a portion near an edge) of a reflective electrowetting display device illustrating several electrowetting pixels 100, according to some embodiments. Though three such electrowetting pixels are illustrated, an electrowetting display device may include any number (usually a very large number, such as thousands or millions) of electrowetting pixels. An electrode layer 102 is formed on a first (e.g., bottom) support plate 104 and may comprise one or more individual electrodes in each electrowetting pixel.

In various embodiments, electrode layer 102 may be connected to any number of thin film transistors (TFTs) (not illustrated) that are switched to either select or deselect electrowetting pixels 100 using active matrix addressing, for example. A TFT is a particular type of field-effect transistor that includes thin films of an active semiconductor layer as well as a dielectric layer and metallic contacts over or on a supporting (but non-conducting) substrate, which may be glass or any of a number of other transparent or non-transparent materials, for example.

In some implementations, a barrier layer 106 may at least partially separate electrode layer 102 from a hydrophobic layer 108 also formed on first support plate 104. In some implementations, hydrophobic layer 108 may comprise any of a number of types of fluoropolymers, such as AF1600®, produced by DuPont, based in Wilmington, Del. Hydrophobic layer 108 may also be any of a number of water-repelling materials that affect wettability of an adjacent material, for example.

Pixel walls 110 form a patterned electrowetting pixel grid on hydrophobic layer 108. Pixel walls 110 may comprise a photoresist material such as, for example, epoxy-based negative photoresist SU-8. The patterned electrowetting pixel grid comprises rows and columns that form an array of electrowetting pixels. For example, an electrowetting pixel may have a width and length in a range of about 50 to 500 microns. In some implementations, the pixel walls need not be on the hydrophobic layer. For example, pixel walls may be directly on the electrode layer (not illustrated in FIG. 1).

A first fluid 112, which may have a thickness (e.g., depth, height) in a range of about 1 to 10 microns, for example, overlies hydrophobic layer 108. First fluid 112 is partitioned by pixel walls 110 of the patterned electrowetting pixel grid. An outer rim 114 may comprise the same material as pixel walls 110. A second fluid 116, such as an electrolyte solution, overlies first fluid 112 and pixel walls 110 of the patterned electrowetting pixel grid. First fluid 112 is at least partially immiscible with second fluid 116 so that the first fluid and the second fluid do not substantially mix with each other, and in some examples do not mix with each other to any degree. Herein, substances are immiscible with one another if the substances do not substantially form a solution. Second fluid 116 is preferably transparent, but may be colored or absorbing. First fluid 112 is non-polar and may for instance be an alkane like hexadecane or (silicone) oil.

A second (e.g., top) support plate 118 covers second fluid 116 and edge seals 120 maintain second fluid 116 over the electrowetting pixel array. Support plate 118 may be supported by edge seals 120 and a spacer grid 122, a portion of which is illustrated in FIG. 1. Spacer grid array 122 may substantially extend over the array of pixels 100. For example, portions of spacer grid 122 may extend from tops 124 of pixel walls 110 to second support plate 118.

The reflective electrowetting display device has a viewing side 128 on which an image formed by the electrowetting display device may be viewed, and a rear side 130. Second support plate 118 faces viewing side 128 and first support plate 104 faces rear side 130. The electrowetting display device may be an active matrix driven display type or a passive matrix driven display, just to name a few examples.

Separation block 132 represents a discontinuity of electrical conductivity along electrode layer 102. For example, a first portion 134 of electrode layer 102 may be electrically insulated or separated from a second portion 136 and a third portion 138 of electrode layer 102 so that each portion 134, 136, and 138 is connected to a respective pixel region. Electrode layer 102 need not extend to edges of the display area of the electrowetting display device, as illustrated in the figure.

In some embodiments, electrowetting pixels may include a second electrode 140 disposed on second support plate 118, one or more color filters (not illustrated), or a black matrix (not illustrated). The electrode on the second support plate may or may not be patterned to form any of a number of circuit configurations, for example.

Hydrophobic layer 108 is arranged on first support plate 104 to create an electrowetting surface area. The hydrophobic character causes first fluid 112 to adjoin preferentially to first support plate 104 since first fluid 112 has a higher wettability with respect to the surface of hydrophobic layer 108 than second fluid 116. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid tends to form a film on the surface of the solid.

First fluid 112 absorbs at least a part of the optical spectrum. First fluid 112 may be transmissive for a part of the optical spectrum, forming a color filter. For this purpose, the fluid may be colored by addition of pigment particles or dye, for example. Alternatively, first fluid 112 may be colored or black (e.g., absorbing substantially all parts of the optical spectrum) or reflecting. Hydrophobic layer 108 may be transparent or colored. A reflective layer may reflect the entire visible spectrum, making the layer appear white, or part of it, making it have a color.

If a voltage is applied across electrowetting pixel 100 (e.g., between electrode layer 102 and second electrode 140), electrowetting pixel 100 will enter into an active state. Electrostatic forces will move second fluid 116 toward electrode layer 102, thereby displacing first fluid 112 from the area of hydrophobic layer 108 to pixel walls 110 surrounding the area of hydrophobic layer 108, to a droplet-like shape. Such displacing action at least partly uncovers first fluid 112 from the surface of hydrophobic layer 108 of electrowetting pixel 100.

If the voltage across electrowetting pixel 100 is returned to an inactive signal level of zero or a value near to zero, electrowetting pixel 100 will return to an inactive state, where first fluid 112 flows back to cover hydrophobic layer 108. In this way, first fluid 112 forms an electrically controllable optical switch in each electrowetting pixel 100. Of course, such details of an electrowetting display device are merely examples, and claimed subject matter is not limited in this respect.

Figure 2:
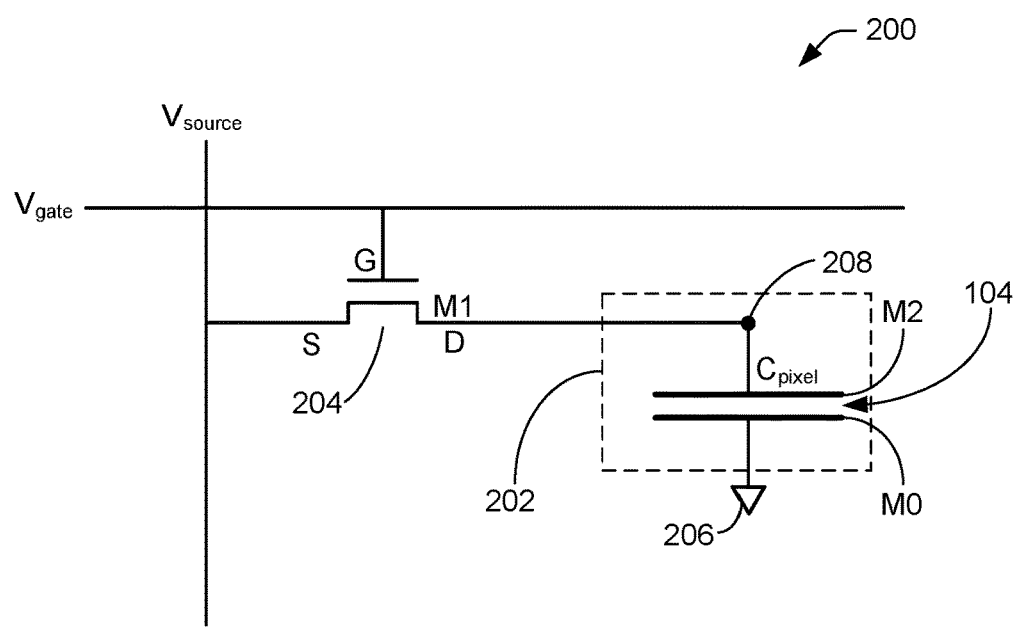
FIG. 2 is a schematic diagram of an electronic circuit representative of a pixel of a display device, according to various embodiments.

FIG. 2 is a schematic diagram of an electronic circuit 200 representative of pixel 202 of a reflective electrowetting display device, according to various embodiments. For example, pixel 202 may be the same as or similar to electrowetting pixel 100, illustrated in FIG. 1. The reflective electrowetting display device includes an array of rows and columns of such pixels. The reflective electrowetting display device also includes rows of gate lines and columns of source lines that are connected to TFTs of individual pixels. For example, TFT 204 is connected to a gate line $V_{gate}$ and a source line $V_{source}$ and acts as a switch to select or deselect pixel 202. In particular, gate line $V_{gate}$ is connected to the gate of TFT 204 and a source line $V_{source}$ is connected to the source of TFT 204. The drain of TFT 204 is connected to pixel 202. Pixel 202 includes capacitance $C_{pixel}$, which represents a capacitance formed by a multiple dielectric layer stack between two electrodes (not shown in FIG. 2) of pixel 202. As described below, material between the two electrodes may include, among a number of things, one or more FMIs that result in non-homogeneous electric fields due to location-dependent values of dielectric constant. For example, a dielectric constant for an FMI may be substantially greater (e.g., by more than about 25%) than a dielectric constant of portions neighboring the FMI (correspondingly, a dielectric constant for portions neighboring an FMI may be substantially less (e.g., by more than about 25%) than a dielectric constant of the FMI).

Pixel 202 may include three conductive layers which may, for example, be metal or a conductive semiconductor material. The three conductive layers are referred to as M0, M1, and M2, respectively. M0 may comprise a conductive layer in electrical connection with a top support plate (e.g., 116, shown in FIG. 1) of pixel 202. M1 may comprise a first conductive layer in a bottom support plate (e.g., 104, shown in FIG. 1) of pixel 202, and M2 may comprise a second conductive layer in the bottom support plate. M0 may be connected to a potential ground 206 of the reflective electrowetting display device. M1 may be connected to the drain of TFT 204. M2 may comprise a reflective layer such as, for example, electrode layer 102 (illustrated in FIG. 1) connected to TFT 204. In some example embodiments, M2 may comprise a reflective layer (e.g., a metal) disposed on an ITO layer.

An FMI may be located at an electrical junction or interface between M1 (e.g., the drain of TFT 204) and M2 where M1 and M2 are electrically interconnected with one another, for example.

Figure 3:
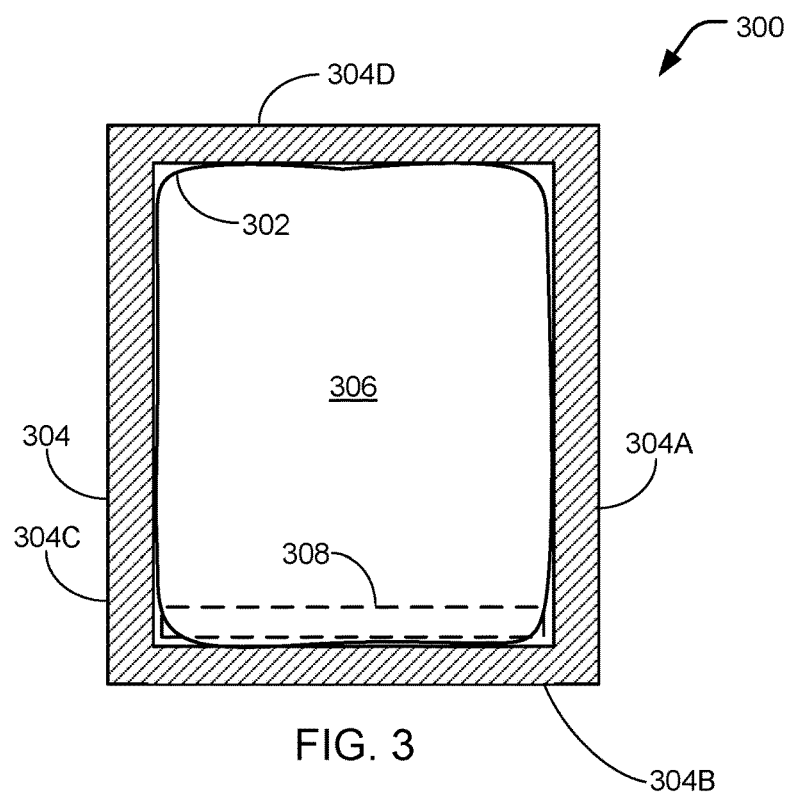
FIG. 3 illustrates a top view of an electrowetting pixel mostly covered with an electrowetting fluid, according to some embodiments.

FIG. 3 illustrates a top view of an electrowetting pixel 300 in an inactive state if the pixel is substantially covered with an electrowetting fluid 302, according to some embodiments. For example, electrowetting fluid 302 may comprise an opaque oil. Pixel 300 includes pixel walls 304 surrounding a pixel region 306. Pixel walls 304 present a peripheral boundary to electrowetting fluid 302. Though not shown in FIG. 3, electrowetting pixel 300 includes another electrowetting fluid overlying electrowetting fluid 302 and pixel walls 304. For example, while electrowetting fluid 302 may comprise an oil, the overlying electrowetting fluid may comprise an electrolyte solution.

A portion of pixel region 306 includes an FMI 308. FMI 308 may provide a number of functions. For example, FMI 308 may lead to relatively high electric field gradients along an extended length adjacent to a pixel wall (e.g., pixel wall 304B in the illustrated example), which may be used to initiate flow of electrowetting fluid 302 during a transition of pixel 300 from an inactive state to an active state. Such an extended length may give rise to a patterned or non-homogeneous electric field. Sizes and proportions (e.g., lengths and widths) of FMI 308 as illustrated are merely examples, and claimed subject matter is not limited in this respect.

In some embodiments, an L-shaped FMI or a square FMI in an inside corner of two adjacent pixel walls (e.g., 304A and 304B) may replace FMI 308. For example, FMI 308 is located along pixel wall 304B, but an L-shaped FMI may be located along two of the four pixel walls 304, namely 304A and 304B, or 304B and 304C.

Figure 4:
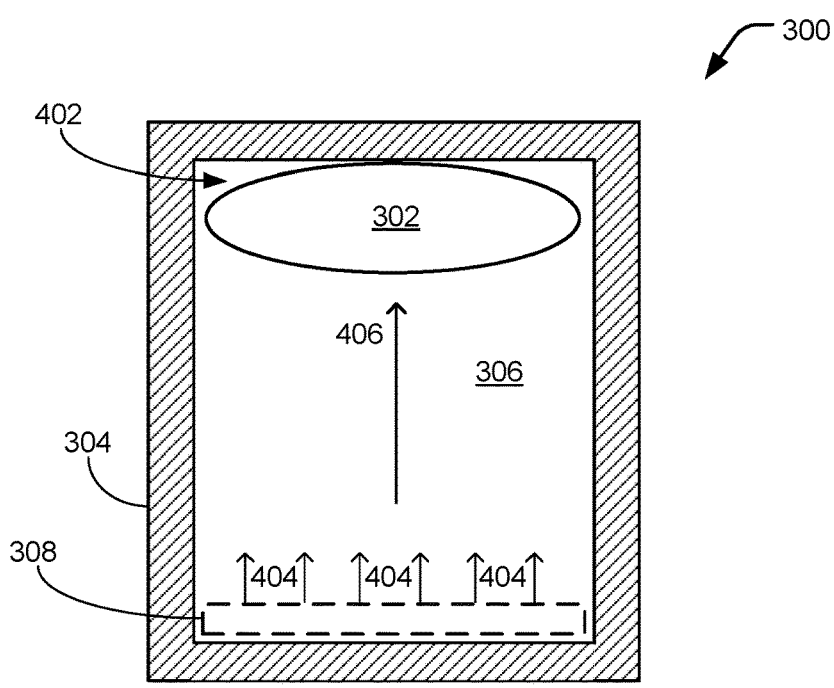
FIG. 4 illustrates a top view of an electrowetting pixel mostly exposed by an electrowetting fluid, according to some embodiments.

FIG. 4 illustrates a top view of electrowetting pixel 300 in an active state if a reflective layer (e.g., conductor M2) in pixel region 306 is substantially exposed by electrowetting fluid 302, according to some embodiments. In this case, electrowetting fluid 302 may be displaced by the overlying electrolyte solution so that electrowetting fluid 302 collects as a bead toward an end region 402 of pixel region 306. To place electrowetting pixel 300 into an active state, an electrical charge is placed on FMI 308 to create an inhomogeneous electric field that is strongest at the FMI and becomes weaker as distance from the FMI increases. In particular, electrical charge may be placed on substantially the entire pixel region 306. But because of the configuration of FMI 308, electrical charge on the FMI gives rise to an electric field gradient that is greatest along edges of FMI 308, as compared to remaining portions of pixel region 306. Accordingly, the overlying electrolyte solution is attracted with the greatest force (e.g., due at least in part to the hydrophobicity of an AF layer (e.g., 106 in FIG. 1)) toward FMI 308. As a result, electrowetting fluid 302 is displaced away from this region, as indicated by arrows 404. This local displacement leads to a global displacement of electrowetting fluid 302 being "pushed" toward end region 402, as indicated by arrow 406. For example, such a pushing or displacing action may be performed by a second electrowetting fluid immiscible with electrowetting fluid 302. In a particular example, electrowetting fluid 302 may be an opaque oil and the second electrowetting fluid may be an electrolyte solution.

Figure 5:
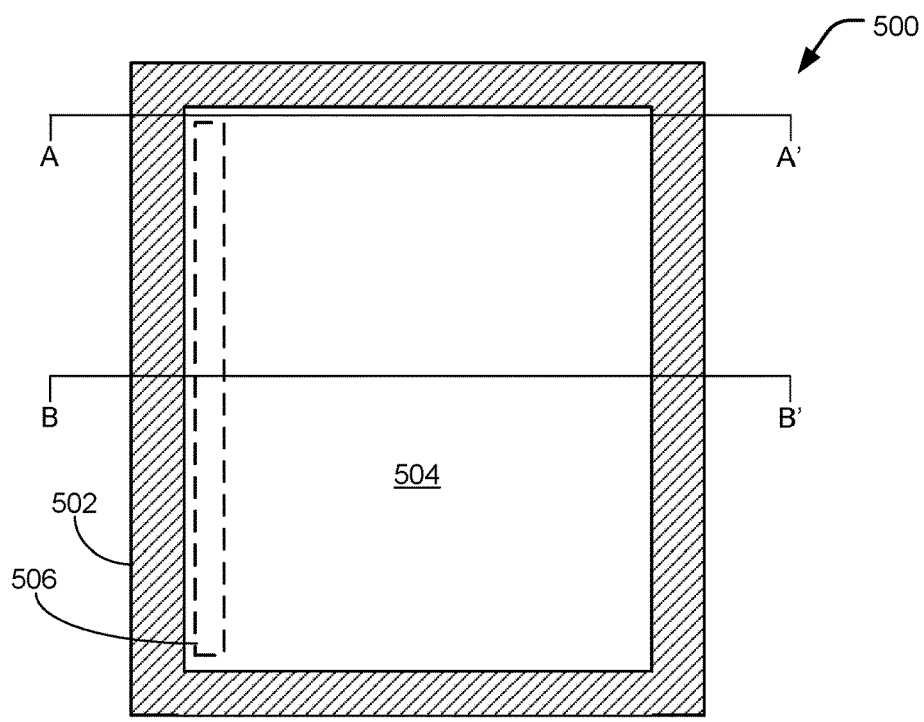
FIG. 5 illustrates a top view of an electrowetting pixel, according to some embodiments.

FIG. 5 illustrates a top view of a portion of an electrowetting pixel 500 sans an electrowetting fluid, according to some embodiments. For example, electrowetting pixel 500 may be similar to or the same as reflective electrowetting pixel 300 illustrated in FIG. 3. An electrowetting fluid is absent in FIG. 5 for sake of clarity.

Pixel 500 includes pixel walls 502 surrounding a pixel region 504. Pixel walls 502 present a peripheral boundary to an electrowetting fluid, such as electrowetting fluid 302 illustrated in FIG. 3. A portion of pixel region 504 includes a FMI 506 covered with an AF layer (e.g., AF layer 106). A remaining portion of pixel region 504 comprises surface that is also covered with the AF layer. FMI 506 may be a portion of an underlying barrier layer that comprises a material having a relatively high dielectric constant. For example, a portion of a dielectric barrier layer that is an FMI may have a dielectric constant at least about double or triple that of other portions of the dielectric barrier layer. For sake of example of the variety of configurations and locations of an FMI, FMI 506 is illustrated as being adjacent to the long-dimension of pixel 500 (in contrast to being adjacent to the short-dimension of pixel 300, illustrated in FIGS. 3 and 4, for example). Cross-section views located along lines A-A' and B-B' are described below.

Figure 6:
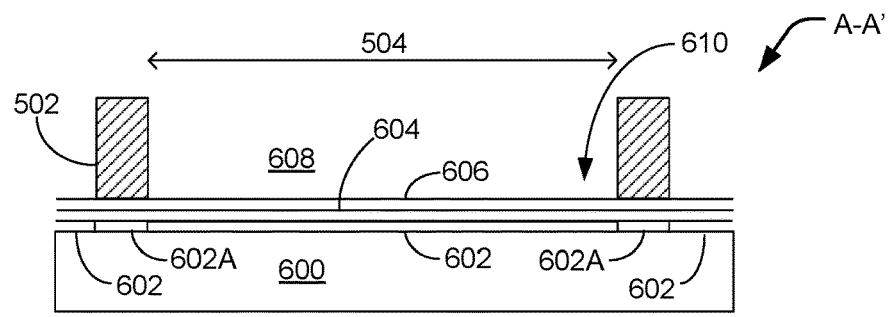
FIG. 6 illustrates a cross-section view of an electrowetting pixel, according to some embodiments.

FIG. 6 illustrates a cross-section view of electrowetting pixel 500 along line A-A', according to some embodiments. Pixel region 504 may be located on a support plate 600, may be substantially flat, and may include, among other things, a conductive layer 602, a dielectric barrier layer 604, and an AF layer 606 at least partially covering the dielectric barrier layer. The conductive layer, dielectric barrier layer, and the AF layer may be formed or otherwise disposed on support plate 600. For a particular example, dielectric barrier layer 604 may comprise SiN and may have a thickness in a range from about 60 nanometers up to about 200 nanometers. For another particular example, conductive layer 602 may be the same as or similar to M1 or M2, illustrated in FIG. 2. Thickness of conductive layer 602 may be in a range from about 150 nanometers up to about 400 nanometers. In substantially the same plane as conductive layer 602, an insulative or dielectric material 602A may be located between adjacent portions of conductive layer 602. An electrowetting fluid 608, which may comprise one or more different fluids that are immiscible with one another, may cover the stack of conductor(s) and dielectric(s) 602-604 and AF layer 606. The surface, at which arrow 610 points, of AF layer 606 is configured to receive light that may impinge on electrowetting pixel 500. AF layer 606 is substantially transparent.

Figure 7:
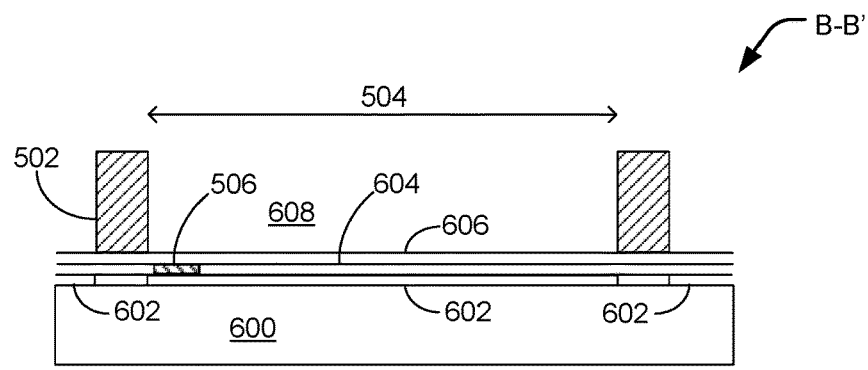
FIG. 7 illustrates another cross-section view of an electrowetting pixel, according to some embodiments.

FIG. 7 illustrates a cross-section view of electrowetting pixel 500 along line B-B', according to some embodiments. FIG. 7 illustrates a portion of pixel region 504 that includes FMI 506. FMI 506 (illustrated in the left portion of pixel region 504) may be a portion of a single FMI, as illustrated in FIG. 5. In some embodiments, however, FMI 506 need not be continuous and may include two or more separated sections. For example, one portion of an FMI may be located in a first location of pixel region 504 while another portion of the FMI may be located in a second non-contiguous location of pixel region 504. The stack of conductor(s) and dielectric(s) 602-604 and AF layer 606 are substantially flat in the pixel region surrounding FMI 506.

In some embodiments, FMI 506 is a portion of dielectric barrier layer 604 comprising dielectric material that has a dielectric constant that is substantially greater than a dielectric constant of remaining portions of the dielectric barrier layer 604. For example, a dielectric constant of FMI 506 may be twice, three, or four times as much or more than a dielectric constant of other portions of dielectric barrier layer 604. In a particular example, a dielectric constant of FMI 506 may be about 7.5 whereas a dielectric constant of other portions of dielectric barrier layer 604 may be about 3.9, though claimed subject matter is not limited to such particular values.

Figure 8:
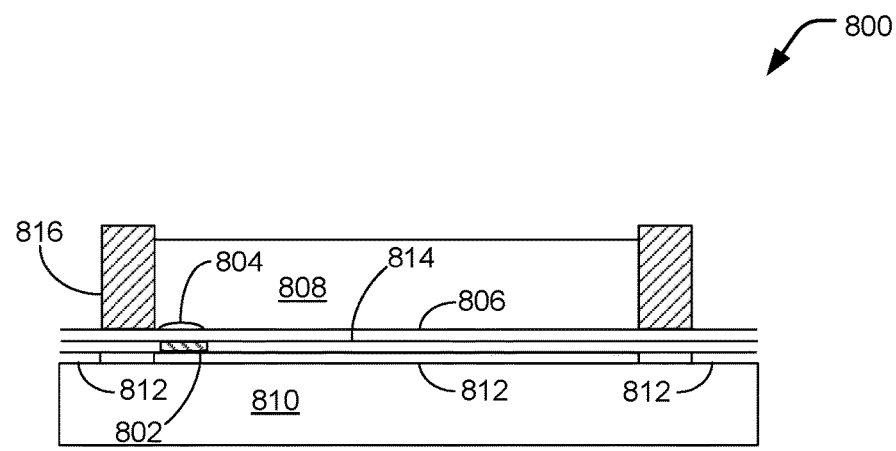
FIG. 8 illustrates yet another cross-section view of an electrowetting pixel, according to some embodiments.

FIG. 8 illustrates a cross-section view of a portion of an electrowetting pixel 800, according to some embodiments. Such a cross-section may be similar to or the same as that illustrated for pixel region 504 in FIG. 5, except that an FMI 802 may be supplemented by a second FMI 804, hereinafter called a "surface FMI." Surface FMI 804 may comprise a portion of a hydrophobic layer 806 that protrudes into a fluid region 808, thus resulting in a "high area" that extends farther from support plate 810 than do remaining portions of hydrophobic layer 806. This is in contrast to examples where hydrophobic layer 806 is substantially flat (e.g., without a high area or bump). Fluid region 808 may include fluids such as first fluid 112 and second fluid 116, as illustrated in FIG. 1, for example. Such a high area results in a relatively lower depth (or thickness) of fluid region 808. This lower depth may complement the non-homogeneous electric field (e.g., field gradient) produced by FMI 802 to initiate movement of fluid (e.g., oil) in the fluid region resulting from overlying electrolyte solution being attracted with a relatively large force due at least in part to the non-homogeneous electric field and the hydrophobicity of hydrophobic layer 806. The resulting local displacement of fluid leads to a global displacement of electrowetting fluid being "pushed" toward an end region of pixel 800, as described above in regards to FIG. 4, for example.

In some embodiments, instead of surface FMI 804 comprising a portion of hydrophobic layer 806 that protrudes into a fluid region 808, a high area of FMI 804 may result from an area of increased thickness in a portion of any one or more of the layers or structure below hydrophobic layer 806. The layers or structures, such as conductive layer 812 or dielectric barrier layer 814, for example, may include a portion below FMI 804 having a greater thickness as compared to other portions of the layer(s) or structure(s). Resultantly, oil of fluid region 808, for example, may be thinner in a localized region thereby promoting earlier onset of oil motion as compared to a case without such a high area (e.g., with an overlaying uniform thickness of oil across the pixel region).

Support plate 810 may further include, among other things, conductive layer 812, which may perform functions of an electrode layer for pixel 800. Dielectric barrier layer 814 may be formed on conductive layer 812. A portion of the dielectric barrier layer may include FMI 804. In some embodiments, the material of dielectric barrier layer 814 and FMI 804 may be the same as one another except that the portion comprising the FMI may be doped with elements that are not included (or to a lesser extend) in remaining portions of dielectric barrier layer 814. Such doping may increase the dielectric constant of the material, for example.

In some examples, surface FMI 804 may be located directly over FMI 802 and separated from FMI 802 by hydrophobic layer 806. FMI 804 may be adjacent (e.g., within about 10% to 25% the width of the pixel) to a pixel wall 816. In some implementations, FMI 804 may be in physical contact with pixel wall 816. In some examples, a portion of FMI 802 may be directly below pixel wall 816. In some examples, surface FMI 804 need not be directly over all portions of FMI 802 and FMI 802 need not be directly under all portions of surface FMI 804.

For a particular example, dielectric barrier layer 814 may comprise SiN and may have a thickness in a range from about 60 nanometers up to about 200 nanometers. Thickness of conductive layer 812 may be in a range from about 200 nanometers up to about 400 nanometers.

Figure 9:
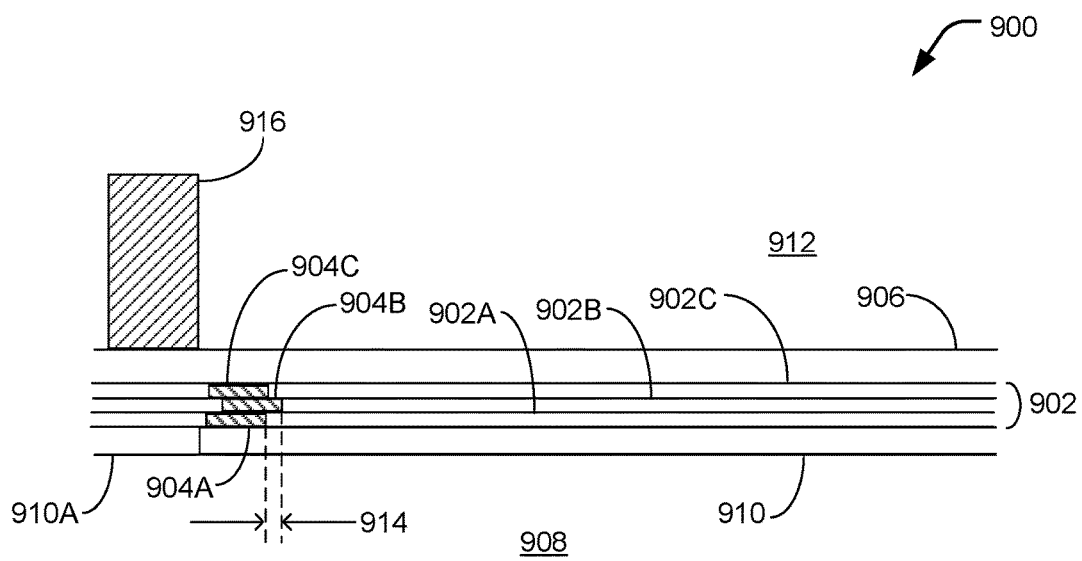
FIG. 9 illustrates a cross-section view of a portion of an electrowetting pixel, according to some embodiments.

FIG. 9 illustrates a cross-section view of a portion of an electrowetting pixel 900, according to some embodiments. Such a cross-section may be similar to or the same as that illustrated for pixel region 504 in FIG. 5, except that a dielectric barrier layer 902 may comprise a multilayer structure. Such a multilayer structure may correspondingly include an FMI 904 comprising multiple layers 904A, 904B, and 904C. For example, FMI layer 904A may comprise a portion of dielectric barrier sublayer 902A, FMI layer 904B may comprise a portion of dielectric barrier sublayer 902B, and FMI layer 904C may comprise a portion of dielectric barrier sublayer 902C. Pixel 900 may include additional layers of the dielectric barrier layer and/or the FMI, and claimed subject matter is not limited in this respect.

Dielectric barrier layer 902 may be covered by a hydrophobic layer 906. A support plate 908 may be at least partially covered with, among other things, a conductive layer 910, which may perform functions of an electrode layer for pixel 900. In substantially the same plane as conductive layer 910, an insulative material or dielectric material 910A may be located between adjacent portions of conductive layer 910.

Dielectric barrier layer 902 may be formed on conductive layer 910. A portion of each sublayer of the dielectric barrier layer may include a respective portion of FMI 904, as described above. In some embodiments, the material of dielectric barrier layer 902 and FMI 904 may be the same as one another except that the portion comprising the FMI may be doped with elements or materials (e.g., metal oxide) that are not included (or to a lesser extend) in remaining portions of dielectric barrier layer 902. Such doping may increase the dielectric constant of the material, for example.

In some embodiments, dielectric barrier layer 902 may comprise alternating organic and inorganic dielectric layers. For example, dielectric barrier sublayer 902A may comprise an organic layer or an inorganic layer. An inorganic layer may comprise silicon oxide, silicon nitride or alumina, just to name a few examples. An organic layer may comprise polyamide, for example.

For a particular example, dielectric barrier sublayer 902A may comprise a first inorganic layer covering conductive layer 910, dielectric barrier sublayer 902B may comprise an organic layer disposed on the first inorganic layer, and dielectric barrier sublayer 902C may comprise a second inorganic layer disposed on the organic layer. The first inorganic layer and the second inorganic layer may comprise the same material or different materials from each other.

In some embodiments, layers 904A, 904B, and 904C of FMI 904 may be vertically aligned so as to be laterally offset from one another. Such a displaced configuration may enhance impermeability and avoid penetration or transmission of electrolyte from fluid region 912, for example, through dielectric barrier layer 902. As a counter example, if layers 904A, 904B, and 904C were vertically aligned with one another (not illustrated) then the interface between layers 904A, 904B, and 904C and corresponding layers of dielectric barrier sublayers may form a path through which a negligible amount of electrolyte solution may flow through all the sublayers of dielectric barrier layer 902. Such a flow may be inhibited or prohibited by including a lateral offset 914 from one layer of FMI 904 to the adjacent layers of the FMI.

In some examples, each layer 904A, 904B, and 904C may be about 100 nano meters thick and lateral offset 914 may be about 10% of the thickness, though claimed subject matter is not limited to such examples. Portions of any or all layers 904A, 904B, and 904C may be directly below a pixel wall 916. In some examples, a surface FMI (e.g., 804) may be combined with a multilayer FMI (e.g., 904).

Figure 10:
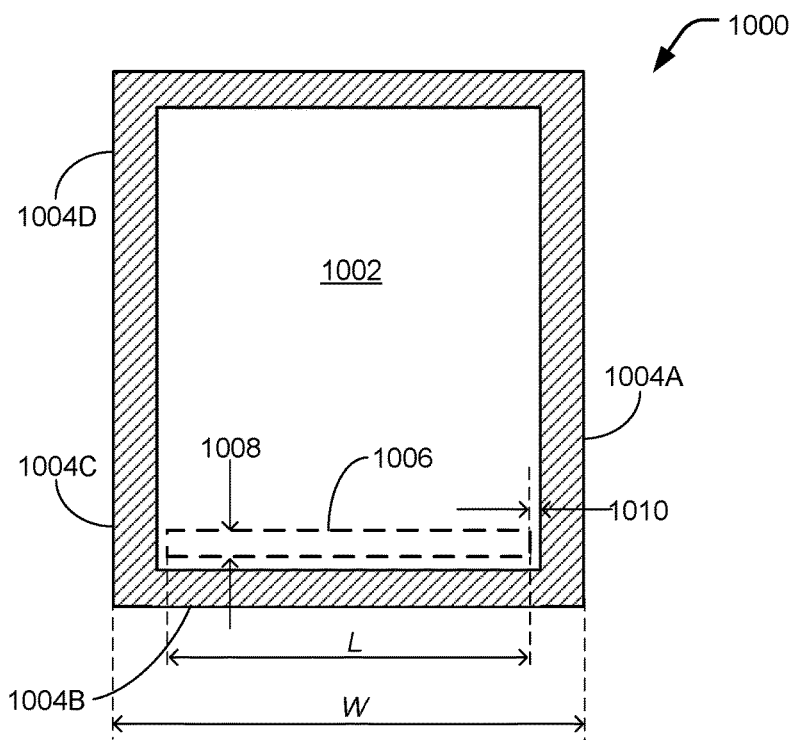
FIG. 10 illustrates a top view of an electrowetting pixel, according to some embodiments.

FIG. 10 illustrates a top view of an electrowetting pixel 1000, according to some embodiments. For example, electrowetting pixel 1000 may be similar to or the same as electrowetting pixel 500 illustrated in FIGS. 5-7. Electrowetting pixel 1000 includes a pixel region 1002 surrounded by pixel walls 1004A-D, which may be continuous around the perimeter of pixel region 1002 but may be identified as having four walls 1004A, 1004B, 1004C, and 1004D. Each such pixel wall may be shared by an adjacent electrowetting pixel (not shown). Herein, a first pixel being "adjacent" to a second pixel indicates that there is not an intervening third pixel between the first and second pixels. Thus, in some examples, two adjacent pixels may be separated by a pixel wall, where the pixel wall may comprise a first-colored portion and a second-colored portion.

Pixel 1000 includes an FMI 1006 that is rectangular and adjacent to a substantial portion of a pixel wall (e.g., 1004B). FMI 1006 may be adjacent to one or more of the four pixel walls. In a particular example, width 1008 of portions of FMI 1006 adjacent to pixel wall 1004B may be in a range from about 2% up to about 20% of the width W of electrowetting pixel 1000. For example, an electrowetting pixel may have a width and length in a range of about 50 to 500 microns. A distance 1010 between pixel walls 1004A-C and FMI 1006 may be in a range from zero to about 10% or 20% of width W. In some implementations, a length 1012 of FMI 1006 may be in a range from about 5% to about 95% of length L.

Figure 11:
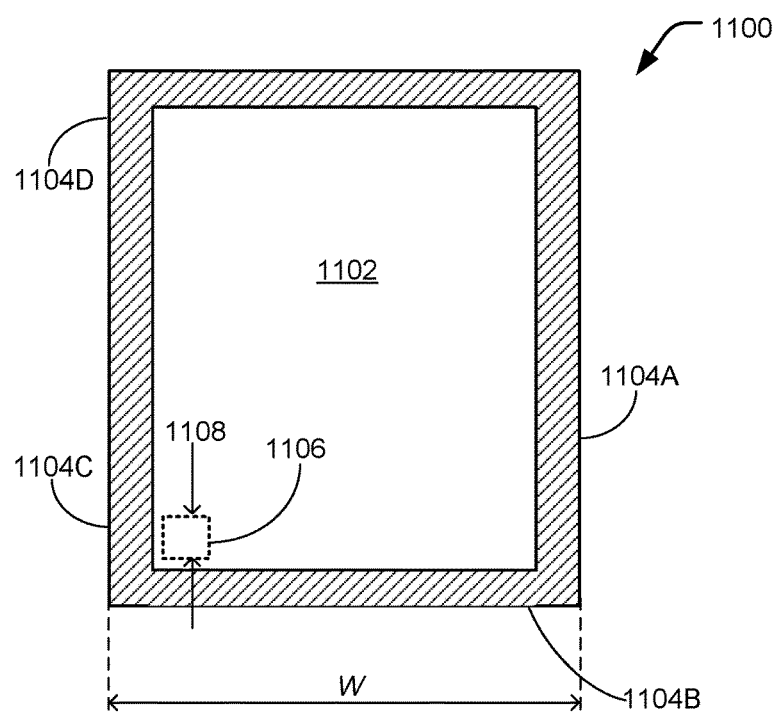
FIG. 11 illustrates a top view of another electrowetting pixel, according to some embodiments.

FIG. 11 illustrates a top view of an electrowetting pixel 1100, according to some embodiments. For example, electrowetting pixel 1100 may be similar to or the same as electrowetting pixel 500 illustrated in FIGS. 5-7. Electrowetting pixel 1100 includes a pixel region 1102 surrounded by pixel walls 1104A-D, which may be continuous around the perimeter of pixel region 1102 but may be identified as having four walls 1104A, 1104B, 1104C, and 1104D. Each such pixel wall may be shared by an adjacent electrowetting pixel (not shown).

Pixel 1100 includes an FMI 1106 that is substantially square and adjacent to an inside corner of two adjacent (intersecting) pixel walls 1104B and 1104C. In a particular example, width and/or height 1108 of portions of FMI 1106 adjacent to pixel wall 1104B may be in a range from about 2% up to about 20% of the width W of electrowetting pixel 1100. For example, an electrowetting pixel may have a width and length in a range of about 50 to 500 microns.

Figure 12:
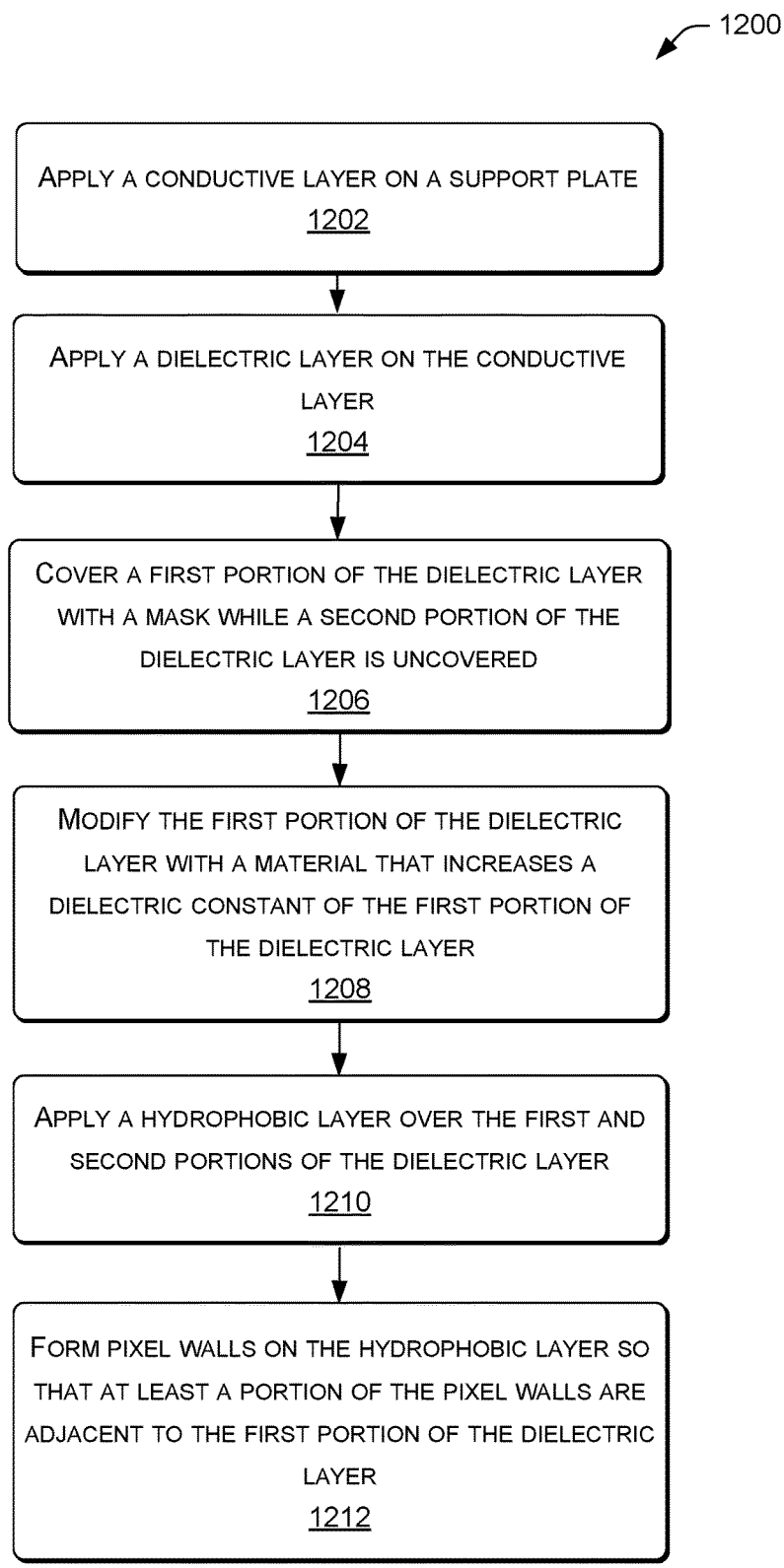
FIG. 12 is a flow diagram of a process for fabricating an electrowetting display device, according to various example embodiments.

FIG. 12 is a flow diagram of a process 1200 for fabricating an electrowetting display device, according to various embodiments. For example, the display device may be the same as or similar to the display device illustrated in FIG. 1. Though claimed subject matter is not limited in this respect, process 1200 may be performed manually (e.g., by humans) and/or automatic equipment. At block 1202, a conductive layer is applied on a support plate. For example, the conductive layer may be M1 illustrated in FIG. 2 or conductive layer 602 illustrated in FIG. 6. The conductive layer may be a metal such as tin, copper, gold, or an alloy of such metals, for example. In some examples, the conductive layer may be applied by deposition techniques that include, for example, chemical vapor deposition (CVD), physical vapor deposition (PVD), molecular beam epitaxy (MBE), sputtering, and so on. A support plate may be the same as or similar to support plate 104 illustrated in FIG. 1.

At block 1204, a dielectric layer (e.g., 604, illustrated in FIG. 6) is applied, for example deposited, on the conductive layer. The dielectric layer may comprise SiN, SiON, SiO, or TaO, just to name a few examples. Additionally, in some embodiments, the dielectric layer may comprise a multilayer structure that includes organic and inorganic sublayers. Any of a number of deposition techniques may be used to apply the dielectric layer onto the conductive layer, such as CVD, PVD, MBE, and sputtering, for example. At block 1206, a first portion of the dielectric layer is covered with a mask while a second portion of the dielectric layer is uncovered. For example, a lithographic process incorporating a pattern mask may be used to form a patterned dielectric layer that defines the first portion and the second portion. In some implementations, a deposition or doping process may alter the physical and/or chemical composition of the first portion, which is exposed by the pattern mask resulting in the first portion having a dielectric constant substantially greater than that of the second portion. In other implementations, the mask may cover the first portion of the dielectric layer while the second portion of the dielectric layer is uncovered. Subsequently, a nano-imprinting process may be performed to imprint a material into the first portion of the dielectric layer to increase the dielectric constant of the first portion of the dielectric layer.

At block 1208, the first portion of the dielectric layer may be modified with a material that increases a dielectric constant of the first portion of the dielectric layer. Thus, the first portion of the dielectric layer may have a substantially greater dielectric constant as compared to a dielectric constant of the second portion of the dielectric layer. The first portion may thus form an FMI, such as FMI 506 illustrated in FIG. 5.

At block 1210, a hydrophobic layer (e.g., AF layer 106, illustrated in FIG. 1) may be applied over the first and second portions of the dielectric layer. At block 1212, pixel walls may be formed on the hydrophobic layer so that at least a portion of the pixel walls are adjacent to the first portion of the dielectric layer. In some implementations, the pixel walls may be formed by depositing a photoresist material on the hydrophobic layer and subsequently etching the photoresist material with a pattern configured to form the pixel walls. The photoresist material may comprise, for example, epoxy-based negative photoresist SU-8.

Figure 13:
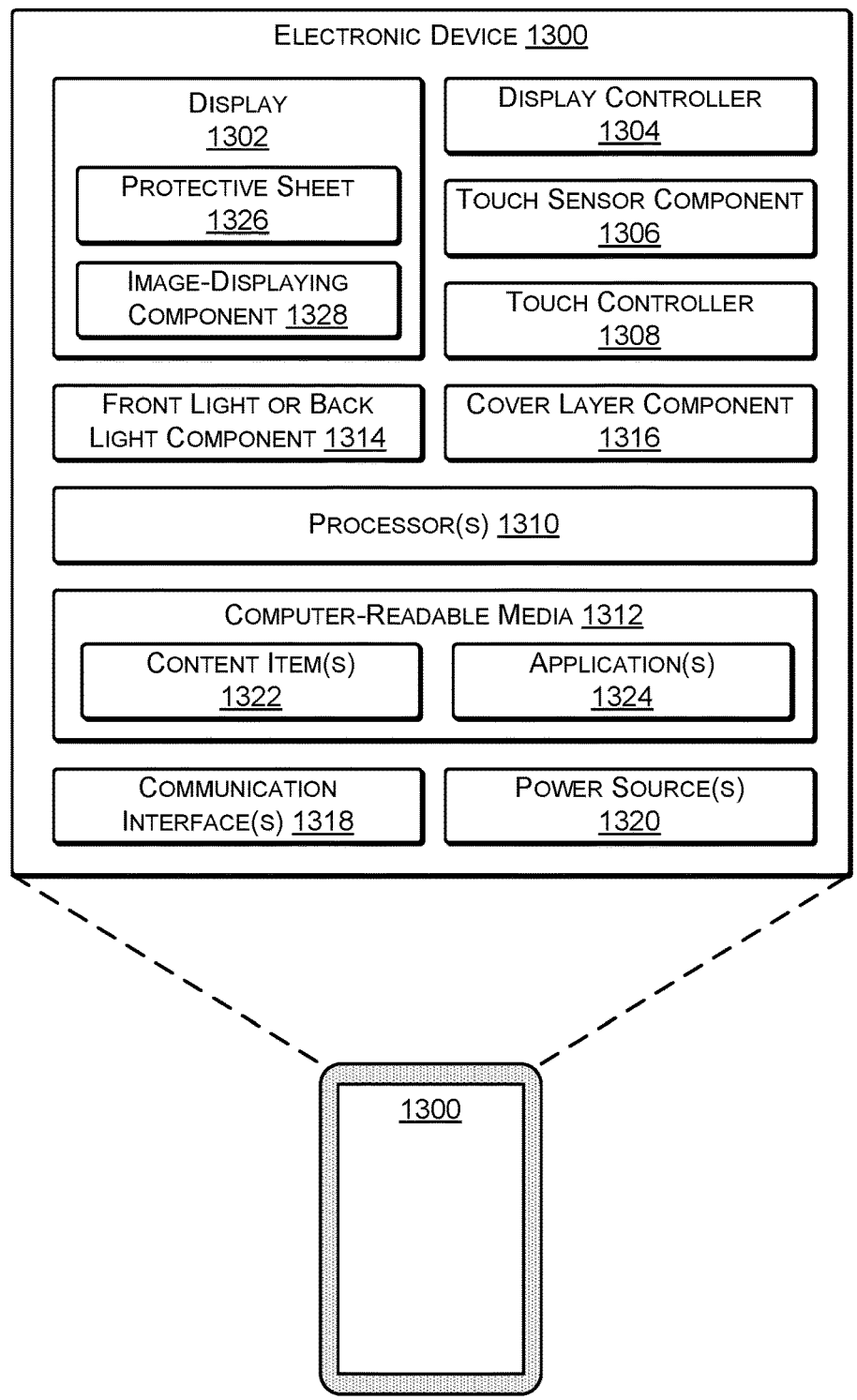
FIG. 13 illustrates an example electronic device that may incorporate a display device, according to some embodiments.

FIG. 13 illustrates an example electronic device 1300 that may incorporate any of the display devices discussed above. The device 1300 may comprise any type of electronic device having a display. For instance, the device 1300 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 1300 may be a non-mobile electronic device (e.g., a computer display, a television, etc.). In addition, while FIG. 13 illustrates several example components of the electronic device 1300, it is to be appreciated that the device 1300 may also include other conventional components, such as an operating system, system busses, input/output components, and the like. Further, in other examples, such as in the case of a television or computer monitor, the electronic device 1300 may only include a subset of the components illustrated.

Regardless of the specific implementation of the electronic device 1300, the device 1300 includes a display 1302 and a corresponding display controller 1304. The display 1302 may represent a reflective or transmissive display in some instances.

In an implementation, the display comprises an electrowetting display that employs an applied voltage to change the surface tension of a fluid in relation to a surface. For example, such an electrowetting display may include the array of pixels 130 illustrated in FIG. 1, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by contracting a colored oil film if a voltage is applied to individual pixels of the display. If the voltage is absent, the colored oil forms a continuous film within a pixel, and the color may thus be visible to a user of the display. On the other hand, if the voltage is applied to the pixel, the colored oil is displaced and the pixel becomes transparent. If multiple pixels of the display are independently activated, the display may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 1302 may represent a backlit display, examples of which are mentioned above.

In addition to including the display 1302, FIG. 13 illustrates that some examples of the device 1300 may include a touch sensor component 1306 and a touch controller 1308. In some instances, at least one touch sensor component 1306 resides with, or is stacked on, the display 1302 to form a touch-sensitive display. Thus, the display 1302 may be capable of both accepting user touch input and rendering content in response to or corresponding to the touch input. As several examples, the touch sensor component 1306 may comprise a capacitive touch sensor, a force sensitive resistance (FSR), an interpolating force sensitive resistance (IFSR) sensor, or any other type of touch sensor. In some instances, the touch sensor component 1306 is capable of detecting touches as well as determining an amount of pressure or force of these touches.

FIG. 13 further illustrates that the electronic device 1300 may include one or more processors 1310 and one or more computer-readable media 1312, as well as a front light component 1314 (which may alternatively be a backlight component in the case of a backlit display) for lighting the display 1302, a cover layer component 1316, such as a cover glass or cover sheet, one or more communication interfaces 1318 and one or more power sources 1320. The communication interfaces 1318 may support both wired and wireless connection to various networks, such as cellular networks, radio, WiFi networks, short range networks (e.g., Bluetooth®), infrared (IR), and so forth.

Depending on the configuration of the electronic device 1300, the computer-readable media 1312 (and other computer-readable media described throughout) is an example of computer storage media and may include volatile and non-volatile memory. Thus, the computer-readable media 1312 may include, but is not limited to, RAM, ROM, EEPROM, flash memory, or other memory technology, or any other medium that may be used to store computer-readable instructions, programs, applications, media items, and/or data which may be accessed by the electronic device 1300.

The computer-readable media 1312 may be used to store any number of functional components that are executable on the processor 1310, as well as content items 1322 and applications 1324. Thus, the computer-readable media 1312 may include an operating system and a storage database to store one or more content items 1322, such as eBooks, audio books, songs, videos, still images, and the like. The computer-readable media 1312 of the electronic device 1300 may also store one or more content presentation applications to render content items on the device 1300. These content presentation applications may be implemented as various applications 1324 depending upon the content items 1322. For instance, the content presentation application may be an electronic book reader application for rending textual electronic books, an audio player for playing audio books or songs, a video player for playing video, and so forth.

In some instances, the electronic device 1300 may couple to a cover (not illustrated in FIG. 13) to protect the display (and other components in the display stack or display assembly) of the device 1300. In one example, the cover may include a back flap that covers a back portion of the device 1300 and a front flap that covers the display 1302 and the other components in the stack. The device 1300 and/or the cover may include a sensor (e.g., a Hall effect sensor) to detect if the cover is open (i.e., if the front flap is not atop the display and other components). The sensor may send a signal to the front light component 1314 if the cover is open and, in response, the front light component 1314 may illuminate the display 1302. If the cover is closed, meanwhile, the front light component 1314 may receive a signal indicating that the cover has closed and, in response, the front light component 1314 may turn off.

Furthermore, the amount of light emitted by the front light component 1314 may vary. For instance, upon a user opening the cover, the light from the front light may gradually increase to its full illumination. In some instances, the device 1300 includes an ambient light sensor (not illustrated in FIG. 13) and the amount of illumination of the front light component 1314 may be based at least in part on the amount of ambient light detected by the ambient light sensor. For example, the front light component 1314 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 1302 may vary depending on whether the front light component 1314 is on or off, or based on the amount of light provided by the front light component 1314. For instance, the electronic device 1300 may implement a larger default font or a greater contrast if the light is off compared to if the light is on. In some instances, the electronic device 1300 maintains, if the light is on, a contrast ratio for the display that is within a certain defined percentage of the contrast ratio if the light is off.

As described above, the touch sensor component 1306 may comprise a capacitive touch sensor that resides atop the display 1302. In some examples, the touch sensor component 1306 may be formed on or integrated with the cover layer component 1316. In other examples, the touch sensor component 1306 may be a separate component in the stack of the display assembly. The front light component 1314 may reside atop or below the touch sensor component 1306. In some instances, either the touch sensor component 1306 or the front light component 1314 is coupled to a top surface of a protective sheet 1326 of the display 1302. As one example, the front light component 1314 may include a lightguide sheet and a light source (not illustrated in FIG. 13). The lightguide sheet may comprise a substrate (e.g., a transparent thermoplastic such as PMMA or other acrylic), a layer of lacquer and multiple grating elements formed in the layer of lacquer that function to propagate light from the light source towards the display 1302, thus illuminating the display 1302.

The cover layer component 1316 may include a transparent substrate or sheet having an outer layer that functions to reduce at least one of glare or reflection of ambient light incident on the electronic device 1300. In some instances, the cover layer component 1316 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, the protective sheet 1326 may include a similar UV-cured hard coating on the outer surface. The cover layer component 1316 may couple to another component or to the protective sheet 1326 of the display 1302. The cover layer component 1316 may, in some instances, also include a UV filter, a UV-absorbing dye, or the like, for protecting components lower in the stack from UV light incident on the electronic device 1300. In still other examples, the cover layer component 1316 may include a sheet of high-strength glass having an antiglare and/or antireflective coating.

The display 1302 includes the protective sheet 1326 overlying an image-displaying component 1328. For example, the display 1302 may be preassembled to have the protective sheet 1326 as an outer surface on the upper or image-viewing side of the display 1302. Accordingly, the protective sheet 1326 may be integral with and may overlay the image-displaying component 1328. The protective sheet 1326 may be optically transparent to enable a user to view, through the protective sheet 1326, an image presented on the image-displaying component 1328 of the display 1302.

In some examples, the protective sheet 1326 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 1326 may include a coating, such as the hard coating described above. For instance, the hard coating may be applied to the outer surface of the protective sheet 1326 before or after assembly of the protective sheet 1326 with the image-displaying component 1328 of the display 1302. In some examples, the hard coating may include a photoinitiator or other reactive species in its composition, such as for curing the hard coating on the protective sheet 1326. Furthermore, in some examples, the protective sheet 1326 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 1326, thereby protecting the image-displaying component 1328 from UV light.

According to some implementations herein, one or more of the components discussed above may be coupled to the display 1302 using fluid optically-clear adhesive (LOCA). For example, suppose that the light guide portion of the front light component 1314 is to be coupled to the display 1302. The light guide may be coupled to the display 1302 by placing the LOCA on the outer or upper surface of the protective sheet 1326. If the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 1314 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 1314. In other implementations, the LOCA may be placed near a center of the protective sheet 1326, and pressed outwards towards a perimeter of the top surface of the protective sheet 1326 by placing the front light component 1314 on top of the LOCA. The LOCA may then be cured by directing UV light through the front light component 1314. As discussed above, and as discussed additionally below, various techniques, such as surface treatment of the protective sheet, may be used to prevent discoloration of the LOCA and/or the protective sheet 1326.

While FIG. 13 illustrates a few example components, the electronic device 1300 may have additional features or functionality. For example, the device 1300 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within the device 1300 may reside remotely from the device 1300 in some implementations. In these implementations, the device 1300 may utilize the communication interfaces 1318 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

It will be understood that when an element or layer is referred to as being "on", "over", or "connected to" another element or layer, it can be directly on, connected or coupled to the other element or layer or intervening elements or layers may be present. In contrast, when an element is referred to as being "directly on" or "directly connected to" another element or layer, there are no intervening elements or layers present.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device comprising:
a pixel region comprising:
an electrode layer on a portion of a support plate;
a dielectric barrier layer on the electrode layer, the dielectric barrier layer comprising a multilayer structure that comprises an inorganic layer and an organic layer;
a hydrophobic layer on the dielectric barrier layer;
a first fluid on at least a portion of the hydrophobic layer;
a second fluid that is immiscible with the first fluid;
a first dielectric barrier layer portion of the dielectric barrier layer having a first dielectric constant; and
a second dielectric barrier layer portion of the dielectric barrier layer having a second dielectric constant, wherein the first dielectric constant is at least twice as great as the second dielectric constant so as to create a non-homogeneous electric field over the pixel region in response to a non-zero voltage applied across the dielectric barrier layer,
wherein the first dielectric barrier layer portion and the second dielectric barrier layer portion are located in the inorganic layer, and the organic layer comprises a first organic layer portion of the organic layer having a dielectric constant that is at least twice the dielectric constant of a second organic layer portion of the organic layer so as to contribute to the non-homogeneous electric field in response to the non-zero voltage applied across the dielectric barrier layer.

2. The electrowetting display device of claim 1, wherein the first dielectric barrier layer portion comprises a first material that is nano-imprinted with a second material to increase the dielectric constant of the first material.

3. The electrowetting display device of claim 1, wherein the pixel region further comprises a protrusion portion of the hydrophobic layer that protrudes into the first fluid to produce a region of the first fluid that is thinner than other regions of the first fluid.

4. The electrowetting display device of claim 1, wherein a first portion of the hydrophobic layer is on the first dielectric barrier layer portion and not on the second dielectric barrier layer portion, and a second portion of the hydrophobic layer is on the second dielectric barrier layer portion and not on the first dielectric barrier layer portion, and the non-homogeneous electric field comprises:
a first electric field portion corresponding with the first dielectric barrier layer portion; and
a second electric field portion corresponding with the second dielectric barrier layer portion,
wherein the first electric field portion is stronger than the second electric field portion, and the first dielectric barrier layer portion is located in correspondence with a fluid motion initiation location such that, with the first fluid in an inactive state with a substantially zero voltage applied across the dielectric barrier layer, and upon application of the non-zero voltage across the dielectric barrier layer, motion of the first fluid initiates at the fluid motion initiation location.

5. An electrowetting display comprising:
a support plate; and
an electrowetting pixel that comprises:
an electrode layer on the support plate;
a dielectric barrier layer on the electrode layer, wherein the dielectric barrier layer comprises a first dielectric barrier layer portion having a first dielectric constant and a second dielectric barrier layer portion having a second dielectric constant, wherein the first dielectric constant is greater than the second dielectric constant;
a hydrophobic layer on the first dielectric barrier layer portion and the second dielectric barrier layer portion of the dielectric barrier layer;

a fluid region on the hydrophobic layer, the fluid region comprising:
a first fluid at least partly on the hydrophobic layer; and
a second fluid immiscible with the first fluid; and
a protrusion of the hydrophobic layer into the fluid region, wherein the protrusion is over the first dielectric barrier layer portion and is separated from the first dielectric barrier layer portion by at least the hydrophobic layer.

6. The electrowetting display device of claim 5, wherein the first dielectric barrier layer portion is at a first distance from the support plate and the second dielectric barrier layer portion is at a second distance from the support plate, and wherein the first distance is substantially the same as the second distance.

7. The electrowetting display device of claim 5, wherein the dielectric barrier layer comprises a multilayer structure, and wherein the first dielectric barrier layer portion comprises two or more layers that are laterally offset with respect to one another.

8. The electrowetting display device of claim 7, wherein the multilayer structure comprises at least one inorganic layer and at least one organic layer.

9. The electrowetting display device of claim 5, further comprising a pixel wall that partitions the electrowetting pixel from an adjacent electrowetting pixel, wherein the first dielectric barrier layer portion is at least partially between the pixel wall and the electrode layer.

10. The electrowetting display device of claim 5, further comprising a pixel wall that partitions the electrowetting pixel from an adjacent electrowetting pixel, wherein the first dielectric barrier layer portion is adjacent to substantially the entire length of the pixel wall.

11. The electrowetting display device of claim 5, wherein the first dielectric barrier layer portion has a first thickness and the second dielectric barrier layer portion has a second thickness that is substantially different from the first thickness.

12. The electrowetting display device of claim 5, wherein the support plate is a first support plate, and further comprising:
a second support plate facing the first support plate, wherein the first fluid and the second fluid together at least partially fill a space between the first support plate and the second support plate; and
a conductive layer on the second support plate.

13. The electrowetting display device of claim 12, wherein the conductive layer comprises an electrode in contact with the second fluid.

14. The electrowetting display device of claim 5, wherein the first dielectric constant is at least twice the second dielectric constant.

15. The electrowetting display of claim 5, wherein a first portion of the hydrophobic layer is on the first dielectric barrier layer portion and not on the second dielectric barrier layer portion, and a second portion of the hydrophobic layer is on the second dielectric barrier layer portion and not on the first dielectric barrier layer portion.

16. The electrowetting display of claim 5, comprising a fluid motion initiation location associated with the first dielectric barrier layer portion such that, with the first fluid in an inactive state with a substantially zero voltage applied across the dielectric barrier layer, and upon application of a non-zero voltage across the dielectric barrier layer, a non-homogeneous electric field comprising a first electric field portion and a second electric field is created, the first electric field portion stronger than the second electric field portion such that motion of the first fluid initiates at the fluid motion initiation location.

17. A method for fabricating at least a portion of an electrowetting display device, the method comprising:
applying a conductive layer on a support plate;
applying a dielectric layer on the conductive layer;
covering a second portion of the dielectric layer with a mask while a first portion of the dielectric layer is uncovered; and
modifying the first portion of the dielectric layer with a material that increases a dielectric constant of the first portion of the dielectric layer;
applying a hydrophobic layer over the first portion and second portion of the dielectric layer, with a first portion of the hydrophobic layer on the first portion of the dielectric layer and not on the second portion of the dielectric layer, and with a second portion of the hydrophobic layer on the second portion of the dielectric layer and not on the first portion of the dielectric layer; and
forming pixel walls on the hydrophobic layer so that at least a portion of the pixel walls are adjacent to the first portion of the dielectric layer.

18. The method of claim 17, wherein the dielectric constant of the first portion of the dielectric layer, after the modifying, is at least twice greater than the dielectric constant of the second portion of the dielectric layer.

19. The method of claim 17, wherein applying the hydrophobic layer over the first portion and the second portion of the dielectric layer comprises:
applying the hydrophobic layer so as to have a first thickness over the first portion of the dielectric layer and a second thickness over the second portion of the dielectric layer, wherein the first thickness is substantially greater than the second thickness.

20. The method of claim 17, comprising:
determining a portion of the dielectric layer as the first portion for the modifying, the determining based on an intended fluid motion location for a first fluid of an electrowetting pixel of the electrowetting display device.

* * * * *